C. W. FLEMING.
EXHIBITOR.
APPLICATION FILED MAY 17, 1915.

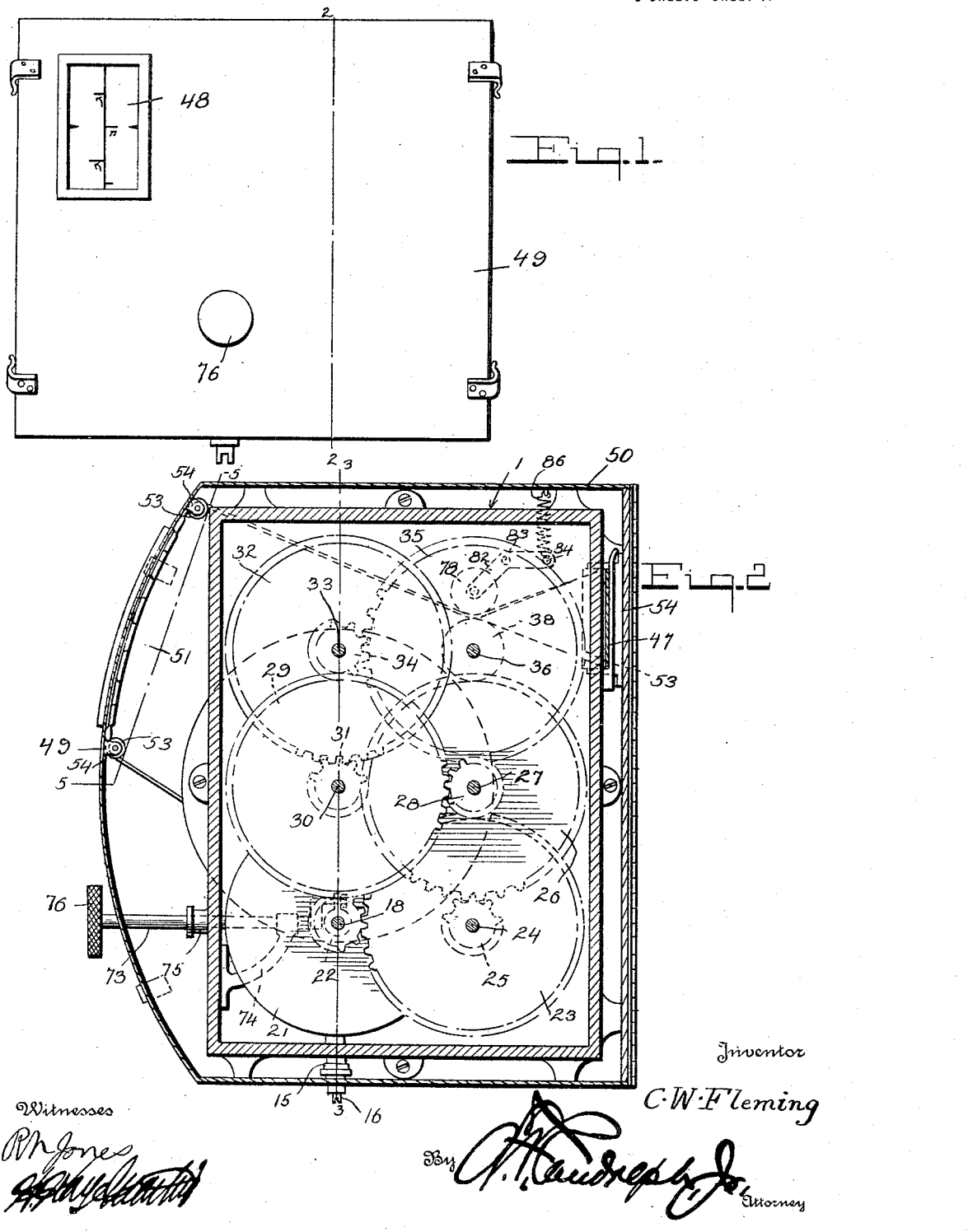

1,205,880.

Patented Nov. 21, 1916.
3 SHEETS—SHEET 2.

Witnesses
R M Jones

Inventor
C. W. Fleming
By [signature]
Attorney

C. W. FLEMING.
EXHIBITOR.
APPLICATION FILED MAY 17, 1915.
1,205,880.
Patented Nov. 21, 1916.
3 SHEETS—SHEET 3.
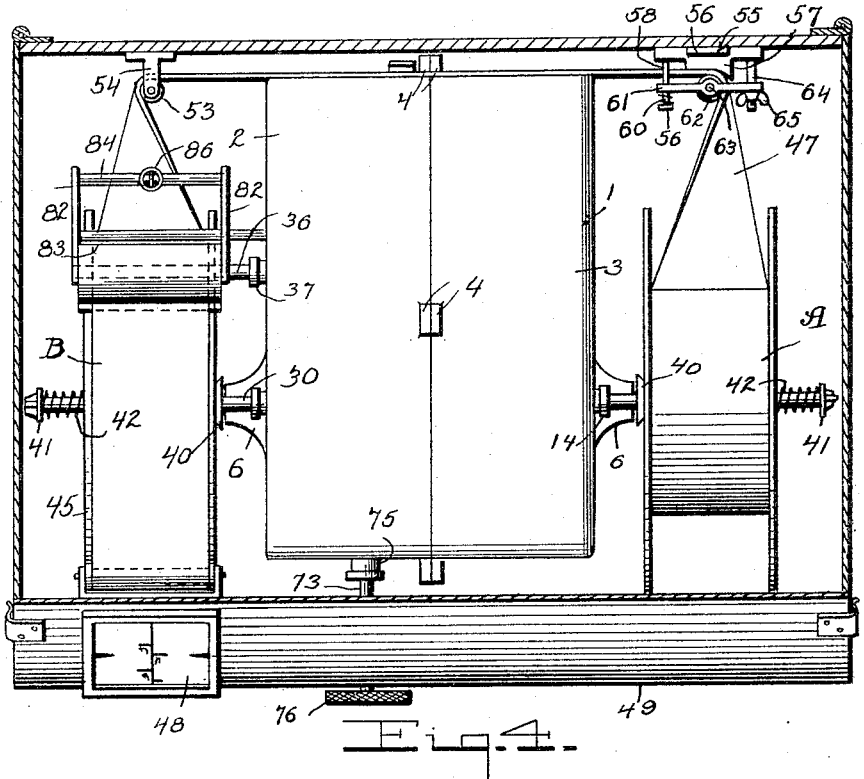
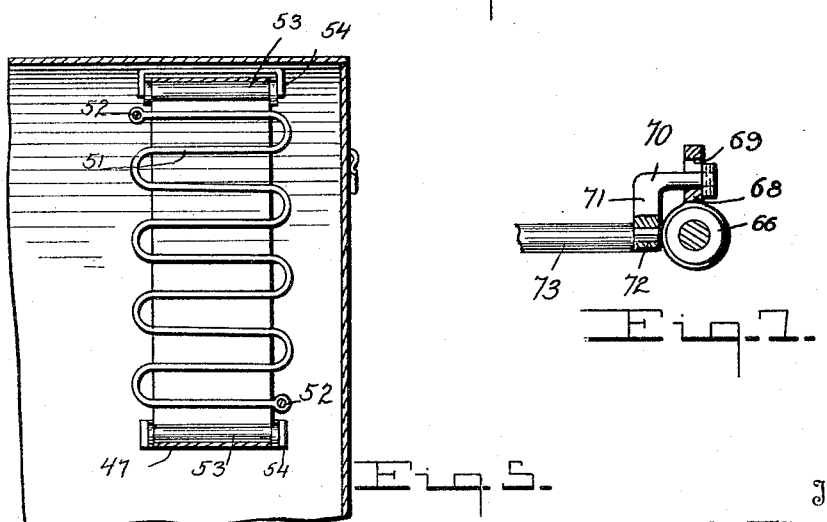
Witnesses
R N Jones
Inventor
C. W. Fleming
By
Attorney

UNITED STATES PATENT OFFICE.

CLARENCE W. FLEMING, OF SPARLAND, ILLINOIS.

EXHIBITOR.

1,205,880.  Specification of Letters Patent.  Patented Nov. 21, 1916.

Application filed May 17, 1915. Serial No. 28,672.

*To all whom it may concern:*

Be it known that I, CLARENCE W. FLEMING, a citizen of the United States, residing at Sparland, in the county of Marshall and State of Illinois, have invented certain new and useful Improvements in Exhibitors; and I do hereby declare the following to be a full, clear, and exact description of the invention, such as will enable others skilled in the art to which it appertains to make and use the same.

This invention relates to new and useful improvements in exhibitors and the principal object of the invention is to provide a road map exhibitor for motor vehicles and the like which will effectively exhibit road maps so that a person driving a motor vehicle will have little or no difficulty in examining the direction to be taken should a cross road be encountered.

Another object of the invention is to provide an exhibitor which will show the main road and the branches therefrom for a given distance ahead of the vehicle.

Still another object of the invention is to provide a device which is reversible so that after the map has been once exhibited, it may be again shown on the return trip without inconveniencing the user.

A further and more specific object of the invention is to provide a road map exhibitor having a glass panel and means for retaining the map against the panel during the time the same is traveling through the machine.

A still further object of the invention is to provide a device wherein the operating mechanism is carried within an oil tight casing so that the driving gears will properly reduce the speed to such an extent as to avoid danger of the map traveling too fast and so that the wear on the driving gears will be minimized, thereby insuring accuracy of the operation of the device.

With these and other objects in view, the invention consists in the novel combination and arrangement of parts which will be fully set forth in the following specification and accompanying drawings, in which:—

Figure 3:
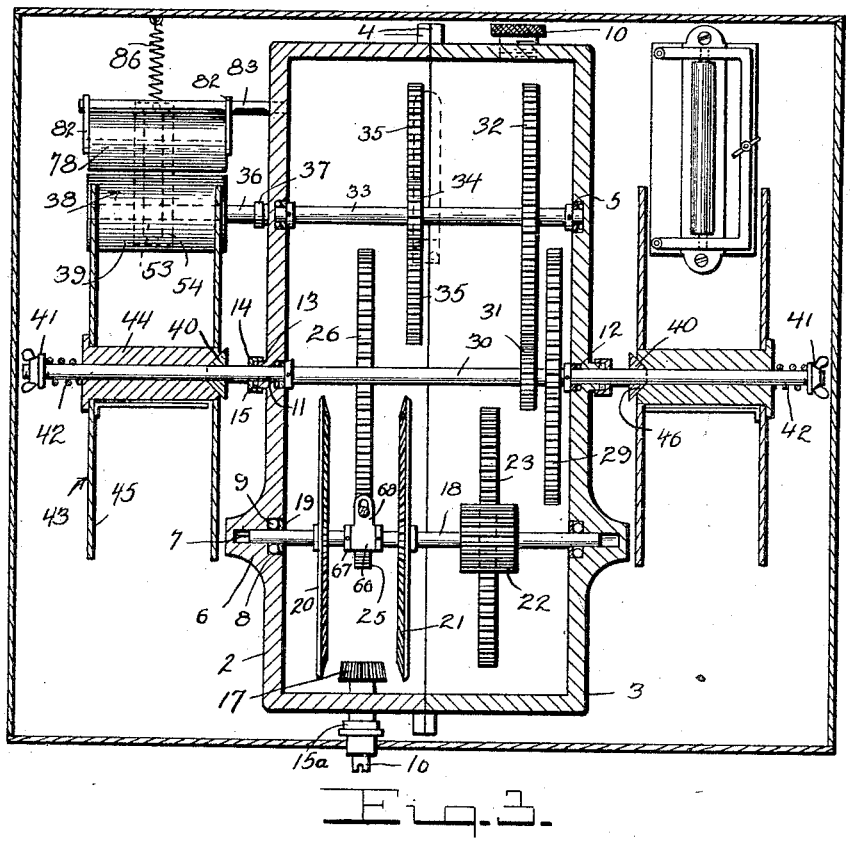
Figure 5:
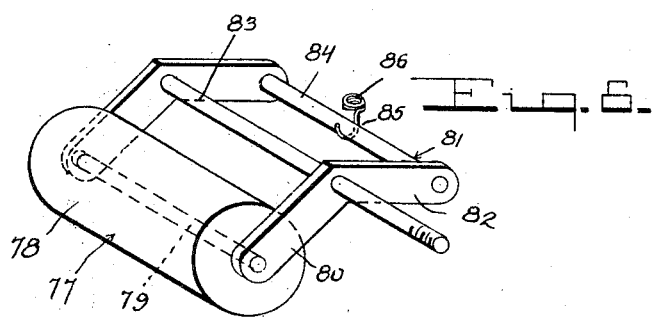

Figure 1 is a face view of a road map exhibitor constructed in accordance with this invention. Fig. 2 is a vertical sectional view on line 2—2 of Fig. 1. Fig. 3 is a vertical sectional view on line 3—3 of Fig. 2. Fig. 4 is a sectional view of the outer casing showing the tape forming the road map and showing the gear casing in elevation. Fig. 5 is a fragmentary sectional view on line 5—5 of Fig. 2. Fig. 6 is a detail perspective view of the tension roller, and Fig. 7 is a fragmentary sectional view of the shifting mechanism.

Referring now to the drawings by characters of reference, the numeral 1 designates as an entirety the gear casing for the speed reducing gears comprising two separate sections 2 and 3. These sections are each provided with the ears 4 formed on their meeting edges which are arranged to receive bolts or the like, by means of which the two sections are held together. Formed in each of the sections and in direct alinement with each other are the recesses 5 for the reception of the shaft bearings which will be more fully hereinafter described. Each of the sections 2 and 3 is formed near its lower end with a suitable outstanding boss 6 and each of these bosses is provided with a recess 7 in which the main drive shaft is rotatably mounted. A suitable enlarged recess 8 is formed at the inner end of each of the recesses 7, which recesses receive the bearings 9 of the main drive shaft of the device. The section 3 is formed with an internally screw threaded filling opening which is closed by means of the cap 10 as clearly shown in Fig. 3. It will thus be seen that the casing 1 may be filled with a suitable lubricant so that the gears contained therein will run in oil and will be prevented from undue wear. Formed intermediate the upper and lower walls of the casing 1 are the openings 11 which are provided at their inner ends with the enlarged recesses 12 and are surrounded exteriorly by the collars 13 having threaded thereon the caps 14 by which suitable packing 15 is retained around the shaft which extends through said openings. Rotatably mounted in a suitably packed bearing 15ª in the bottom wall of the section 2 of the casing 1 is the shaft 16 which is connected to the flexible shaft by which the device is driven and at the upper end of the shaft 16 is the beveled gear 17, the use of which will appear as the description proceeds.

Journaled in the recesses 7 is the main drive shaft of the device designated by the numeral 18 which is provided near each end with suitable cones 19 which run against the bearings 9. Mounted on the shaft 18 are the beveled gear wheels 20 and 21 which are arranged to alternatively mesh with the gear 17 to drive the shaft 18. A suitable spline or spur gear having a broad face 22 is mounted on the shaft 18 near the end opposite the gears 20 and 21 and this gear 22 meshes with the gear teeth of the large gear wheel 23 which is mounted on the shaft 24 which is placed in horizontal alinement and parallel relation to the shaft 18 but directly in the rear of the same as illustrated in Fig. 2. The spur gear 25 is mounted on the shaft 24 near the end opposite the gear 23 and meshes with the gear 26 which is carried on the shaft 27 having mounted thereon the spur gear 28 which in turn meshes with the wheel 29 on the shaft 30 on which the pinion 31 is mounted which in turn meshes with the gear 32 mounted on the shaft 33 on which the pinion 34 is mounted. This pinion 34 transmits power to the gear 35 for driving the shaft 36 which is extended through the packed bearing 37 and carries the friction roll 38 which is formed of a cylindrical body provided with a rubber face 39.

The ends of the shaft 30 extend through the opening 11 in the casing and through the packing surrounding said opening and are provided with the cones 40, the use of which will appear as the description proceeds. The extreme ends of this shaft are provided with screw threads for the reception of the wing nuts 41 which form abutments for the springs 42 as clearly shown in the drawing. Mounted on the extensions of the shaft 30 are suitable reels designated generally by the numeral 43 comprising the cylindrical cores 44, having the flanges 45 secured thereto in any suitable manner. The inner end of each of these cores is recessed as at 46 to receive the cones 40 and the outer ends of these cores form abutments for the inner terminals of the springs 42. It will thus be seen that the reels are held by the springs in engagement with the cones so that they will turn therewith and the amount of frictional engagement between the cones and the cores may be regulated by the thumb nuts 41.

The road map comprises a strip of flexible material preferably tracing cloth or the like designated by the numeral 47 and is primarily wound upon the reel designated A. This strip then passes over suitable guide rollers to the reel designated B upon which it is wound. During the passage of the flexible member it is passed in the rear of the transparent plate 48 which is secured to the curved face 49 of the housing 50 for the whole device. In order to hold the flexible member 47 against the transparent plate, the wire 51 is provided and is bent as shown in Fig. 5 to provide a series of transversely extending bars connected by a bight portion which bars form guides and press the strip against the transparent plate. The end bars are secured as at 52 to the housing and it will thus be seen that a resilient pressure device is provided which will effectively guide the strip and hold the same in position during its passage.

In order to guide the strip from the reel A to the reel B over the proper course, there is provided a number of guide rolls 53 supported in suitable brackets 54 which are located at proper places to properly guide the flexible members during the course of travel. In order to prevent the flexible member from being fed from the reel A too freely, the tension guide roll designated generally by the numeral 55 is provided and comprises the base 56 having the enlarged friction pad 57 formed on the under side thereof and projecting upwardly from the base is a suitable pin 58 provided with a head 59 against which a coil spring 60 abuts. This coil spring 60 bears against the bar 61 provided with the bearing 62 in which the trunnions of the guide roll 63 are mounted. The opposite end of this bar is provided with an opening for the reception of the bolt 64 provided with the wing nut 65 by means of which the same is tightened. It will thus be seen that the tension on the flexible member 47 can be easily regulated so that it will not be too fast for the roll A.

In order to provide a reversing means for the device, the sleeve 66 is rotatably mounted on the shaft 18 between the set collars 67 and this sleeve is formed with an upstanding ear 68 provided with a slot 69 for the reception of the pin 70 formed at the end of the arm 71 which is mounted on the squared portion 72 of the shaft 73 which is journaled in a suitable bracket 74 and extends through the packed bearing 75 in the casing 1.

It will be apparent from the foregoing that in use the gears 20 and 21 are shifted so that either one of them will engage the gear mounted at the inner end of the shaft 16. This will set the shaft 18 in motion thereby driving the gear 22 which meshes with the gear 23 and sets the gear train in motion, thus driving the shafts 30 and 33. It will thus be apparent that when either of the thumb nuts 41 is rotated on its respective end of the shaft 30, the reel on which the map is to be wound will be tightened and it will thus be seen that said reel will be caused to turn with the shaft when the same is rotated. The opposite reel is then loosened and it will thus be seen that the map may be wound upon the tightened reel and off from the opposite reel which is free to turn on the shaft. The rotation of the shaft 33 will drive the friction roller 38 by the rotation of the gear train. The driving of the extension will cause the friction roller 38 to revolve and thereby draw the flexible member over its several guide rollers 53 and across in the rear of the transparent panel 48 and in front of the wire 51 thereby exhibiting the map to the driver. The flexible member is then wound upon the reel B and at the end of the trip the gears may be shifted to the reverse so that the return trip may be made by the same means. In this way it will be clearly seen that road maps may be readily disposed and exhibited so that the driver of motor vehicles and the like can readily tell which road to take in case they encounter cross roads or other confusing points. It is also apparent that a particularly simple and efficient map exhibitor is provided which will readily disclose location and in which it is possible to substitute other maps of different roads, thereby providing a universally useful device.

In order to assist the friction roller 38 in drawing the paper strip or map through the device, the coöperating friction roll designated by the numeral 77 is provided. The structure of the supporting frame of the friction roll 77 is best illustrated in Fig. 6 and said roll consists of a roller 78 mounted on a suitable shaft or axle 79 which in turn is mounted in the forwardly and downwardly extending extensions of the arms 82 which are pivotally mounted on the supporting shaft 83 which in turn is threaded into the section 2 of the gear housing. The rear ends of the arms 82 are connected by a bar 84 and thus the supporting frame designated generally by the numeral 81 is provided. Surrounding the bar 84 is the hook 85 of the retractile coil spring 86, the upper end of which is connected to the top wall of the casing 50 so as to normally and yieldably hold the roller 78 against the roller 38 as clearly illustrated in Fig. 3. In this way it will be seen that the map will be frictionally drawn between the rollers 38 and 78 upon the rotation of the shaft 33.

It is to be understood that if so desired the roller 38 may be provided with a rectangular recess in its end for the reception of a key to enable the user to turn back and make any corrections in the road map which might be necessary.

While in the foregoing there has been shown and described the preferred embodiment of this invention, it is to be understood that such changes may be made in the combination and arrangement of parts as will fall within the spirit and scope of the appended claims.

What is claimed is:—

1. In a road map exhibitor, a shaft, a gear train for controlling the direction of rotation of the shaft, a clutch cone secured to the shaft near each end, thumb nuts adapted to be threaded on opposite ends of the shaft, reels loosely mounted on the shaft intermediate the clutch cones and the thumb nuts and compression coil springs interposed between the thumb nuts and the outer ends of the reels to yieldably hold the reels against the clutch cone.

2. In a road map exhibitor, a shaft, a gear train controlling the direction of rotation of the shaft, clutch cones secured to the shaft near opposite ends, the active faces of said cones being disposed outwardly, reels loosely mounted on the shaft intermediate the clutch cones and the ends of said shaft, the inner faces of the reels being provided with tapered recesses forming clutch faces to receive the clutch cones, thumb nuts threaded on the ends of the shaft, springs interposed between the thumb nuts and the reels to hold said reels against the clutch cones, the position of the thumb nuts gaging the pressure with which the springs bear against the reels and thereby gaging the pressure of the reels against the clutch cones, and guide rollers for guiding the material wound onto and off from the reels.

3. In a road map exhibitor, a shaft, reels loosely mounted on the opposite ends of the shaft, a drive shaft, a friction roll on one end of the drive shaft and positioned in alinement with one of the reels, a coöperating friction roll mounted above the first mentioned friction roll, means to cause the peripheries of the friction rolls to be pressed together and clutch means on the shafts for controlling the rotation of the reels.

In testimony whereof I affix my signature in presence of two witnesses.

CLARENCE W. FLEMING.

Witnesses:
PAULINE NIGHSONGER,
ELIZABETH NIGHSONGER.

Copies of this patent may be obtained for five cents each, by addressing the "Commissioner of Patents, Washington, D. C."